United States Patent [19]

Cai

[11] Patent Number: 5,132,078
[45] Date of Patent: Jul. 21, 1992

[54] DIAGRID FOR A NUCLEAR REACTOR CORE

[75] Inventor: Giulio Cai, Genoa, Italy

[73] Assignee: Ansaldo S.p.A., Genoa, Italy

[21] Appl. No.: 381,770

[22] Filed: Jul. 18, 1989

[30] Foreign Application Priority Data

Jul. 22, 1988 [IT] Italy .................. 12526 A/88

[51] Int. Cl.⁵ ............................................. G21C 15/00
[52] U.S. Cl. ..................................... 376/462; 376/362
[58] Field of Search .............. 376/171, 172, 178, 352, 376/362, 462, 175, 176, 364, 365

[56] References Cited

U.S. PATENT DOCUMENTS

| | | | |
|---|---|---|---|
| 3,893,886 | 7/1975 | Aubert et al. | 376/362 |
| 3,937,653 | 2/1976 | Leheu | 376/362 |
| 4,016,035 | 4/1977 | Gallet et al. | 376/362 |
| 4,207,944 | 6/1980 | Holtz et al. | 165/82 |
| 4,352,778 | 10/1982 | Arnaud et al. | 376/365 |
| 4,505,877 | 3/1985 | Rion | 376/352 |
| 4,851,186 | 7/1989 | Berte et al. | 376/364 |

FOREIGN PATENT DOCUMENTS

| | | |
|---|---|---|
| 0050355 | 4/1982 | European Pat. Off. |
| 0238171 | 9/1987 | European Pat. Off. |
| 2452598 | 5/1976 | Fed. Rep. of Germany |
| 2246941 | 10/1973 | France |
| 2180517 | 11/1973 | France |
| 2274995 | 6/1974 | France |
| 1005133 | 9/1965 | United Kingdom |
| 1159597 | 7/1969 | United Kingdom |
| 1374174 | 11/1974 | United Kingdom |
| 1389134 | 4/1975 | United Kingdom |
| 1396705 | 6/1975 | United Kingdom |
| 1397894 | 6/1975 | United Kingdom |
| 1401142 | 7/1975 | United Kingdom |
| 1480854 | 7/1977 | United Kingdom |
| 1542735 | 3/1979 | United Kingdom |
| 2069224 | 8/1981 | United Kingdom |

Primary Examiner—Daniel D. Wasil
Attorney, Agent, or Firm—Fleit, Jacobson, Cohn, Price, Holman & Stern

[57] ABSTRACT

A diagrid for a nuclear reactor core, of the type with two disc-like plates, for a series of parallel chandelles, and a cylindrical shell fitted with heat-exchanging fluid input and output ducts. A forced fit between the edges of said plates (10,11) and said shell (12) consists of a thick welded joint. The upper ends of each of the chandelles (30) protrudes above the upper surface of the upper plate. The two ends of each of the chandelles are welded to the plates.

4 Claims, 11 Drawing Sheets

DIAGRID FOR A NUCLEAR REACTOR CORE

BACKGROUND OF THE INVENTION

In the field of fabrication of large-sized nuclear components to high quality, mechanical precision and reliability requirements, the use of welding technologies aimed at reducing to a minimum or even completely eliminating the filler metal are arousing increasing interest, due to the undisputable technical and economic advantages deriving from the lower residual stresses after welding and the consequent greater dimensional stability.

Among the many components of a nuclear plant, the case of the diagrid supporting the core of fast-neutron plants is particularly significant.

This component has the fundamental function of conveying the Sodium at a pressure inside the fuel assemblies forming the CORE, and thus of keeping these assemblies in a particularly precise vertical position.

The component is immersed in Sodium at a working temperature which generally varies between 400° and 500° C. Up until the present time, the tendency of manufacturers of this type of component has been towards structures designed basically to be mechanically assembled and bolted together.

Since access to components of this type is impossible during the 30 year life-span of the power plant, and due to the very stringent requirements as far as concerns mechanical strength, precision and geometrical stability, as well as their particularly complex geometry, the considerable thickness of the ring (80 mm) needed to fasten the bolts and the high density and weight of the bolts, a remarkable work burden is entailed in terms of both calculations and fabrication. This, of course, leads to very high overall costs.

This technical and economical aspect may be justified for a prototype plant, but not for the development of a series of reactors.

BRIEF SUMMARY OF THE INVENTION

The subject-matter of this invention consists of an entirely welded diagrid for the core of a nuclear reactor and of the process for manufacturing it by welding.

In manufacturing a structural component by welding, it is generally possible:

to simplify its geometry and thus reduce the quantity of calculations required;

to reduce the weight of the component;

to render the process automatic, thus reducing manufacturing times and costs;

in the case of the diagrid for the core, since this is a pressure vessel, welding also ensures perfect sealing.

Two types of welds are present in the structure according to the invention:

very thick welds between the tube plate and the shell (the load-bearing structure);

the welds between the tube plate and the chandelles, which are thinner and the main function of which is as pressure seals.

The basic requisites normally envisaged for thick welds are the sealing run and X-ray examination.

It must however be stressed that recourse to welding technologies raised some questions as to the dimensional stability of the components at the high temperatures and in the presence of the sudden temperature changes called for by the plant's running conditions, with reference to the release of residual welding stresses as mentioned in the paper on the origins and dangers of internal welding stresses presented by Lezzi and Scavino at the I.I.S Conference in Genoa in 1983.

This invention makes it possible to avoid these risks completely, and to overcome the difficulties of predicting and evaluating the consequences on the geometrical stability of the structure in time.

According to the invention, the welded structure claimed contains two different types of welded joints, to each of which one or more welding techniques can be successfully applied.

The first type of welded joint consists of a thick butt weld, and, as stated above, is used to connect the two tube plates of the diagrid to the shell forming its lateral surface.

The second type of welded joint contained in the diagrid according to the invention consists of a circular joint between each of the chandelles of the diagrid and the relevant tube plate, and which functions mainly as a seal.

Two alternative welding procedures based on different technologies are suggested for the first type of joint called for the invention, as stated above (butt welds joining thick-walled plates).

narrow-gap joints, with submerged-arc depositing of filler metal;

power LASER welding.

Submerged-arc welding provides a number of advantages:

a smaller quantity of filler metal deposited and therefore lower residual welding stresses;

reduction of the deformations consequent to welding shrinkages and consequently of the thickness of the weld metal required to finish the piece;

shorter times for welding and any subsequent mechanical finishing.

The technique suggested for depositing the filler metal is that of two or more passes side by side, or a single pass for the narrower gaps. In the specific case of fast reactors, where these thicknesses are usually limited (40 to 80 mm), and stainless steel is used, this technique has not been encouraged by manufacturers up to now, for several reasons:

in order to achieve significant technical and economical advantages is necessary to reduce the width of the gap still further;

use of the narrow-gap technique for very narrow joints definitely means using a single pass, with several consequent problems:

difficulties in removing the slag, since if this is trapped between the edges of the seam and the walls of the groove, it may give rise to failure to melt during the subsequent pass;

the need to keep the wire constantly at the same distance from the walls of the joint;

availability of specifically designed welding torches guaranteeing at the same time both good electrical contact of the wire and perfect external insulation;

the search for a compromise between processing of more parallel edges and in any case sufficient to compensate for the more serious local deformations typical of stainless materials, linked to their different heat conductivity and expansion properties;

difficulties in repairing any flaws;

a suitable choice of the type of flux, which must be capable of solidifying uniformly so as to create a smooth seam with no notches, and at the same time must produce easily removable and crushable slag.

But these two features often clash with one another. Molten flux, which is preferable to the agglomerated type due to the improved metallurgical results of the joint, unfortunately produces a slag which is more difficult to remove.

These problems have been overcome according to the invention, by using dedicated welding procedures and accessories, as described in detail below.

As far as concerns the second type of joint, too, acting mainly as a seal (circular joints between the outer walls of the chandelles and the tube plate of the diagrid), according to the invention two welding procedures are proposed: electronic beam and power laser welding, both without filler metal.

DETAILED DESCRIPTION OF THE PREFERRED EMBODIMENT

Figure 1:
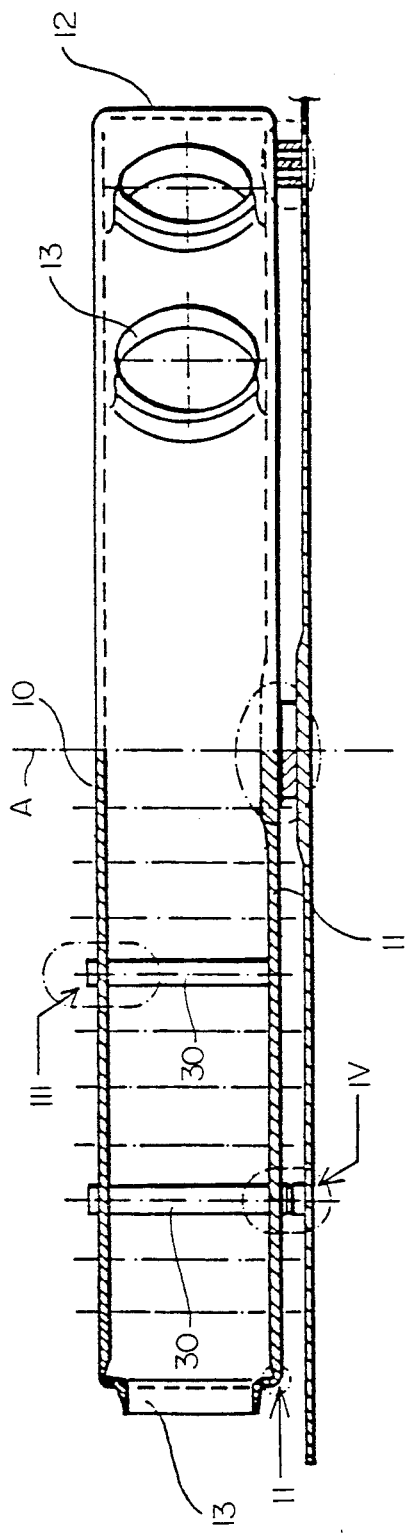
FIG. 1 shows a side view, half as a cross-section, of the diagrid for the core of a nuclear reactor, fabricated, according to the invention, as an entirely welded structure.

The structure of the diagrid for the core of a nuclear reactor according to the invention is schematically represented in FIGS. 1 to 5.

According to the invention this diagrid has an upper tube plate 10 and a lower tube plate 11, peripherically linked by a cylindrical shell 12 having an axis A.

Tubular fittings 13 for the passage of the heat exchange fluid protrude from the cylindrical casing 12. These tubular fittings are either made in one piece, by casting or forging, with the cylindrical casing 12, or welded to it in a previous stage.

The two plates 10 and 11 are of a substantially disclike shape and the bottom and top peripheral edges of the cylindrical casing 12 according to the invention are welded to the peripheral edges of the plates 10 and 11 respectively by means of a full-penetration butt weld 20.

According to the invention this full-penetration butt weld is of the so-called narrow-gap type.

According to the invention the narrow-gap butt weld in the thick plate is made using submerged-arc welding or laser-beam welding.

Further details concerning these two welding processes are given below.

The circular welds between the ends of the chandelles 30 passing through the two tube plates of the diagrid according to the invention are made using a laser beam.

Both types of weld are therefore made using a minimum quantity of filler metal. The term chandelle as used herein means a hollow cylindrical column of the kind commonly used in diagrids.

Figure 2:
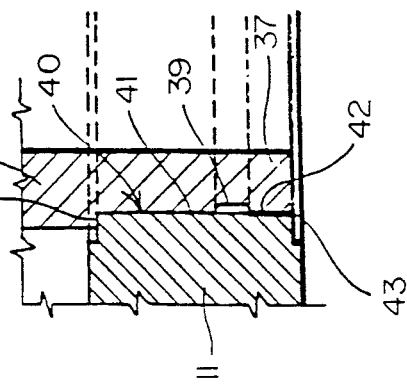
FIG. 2 is, on a larger scale, the detail indicated by II in FIG. 1, and refers to a butt weld in a thick plate.

The weld beam 20 can be seen in FIG. 2; the preliminary preparation of the edges to be welded is illustrated later.

Figure 3:
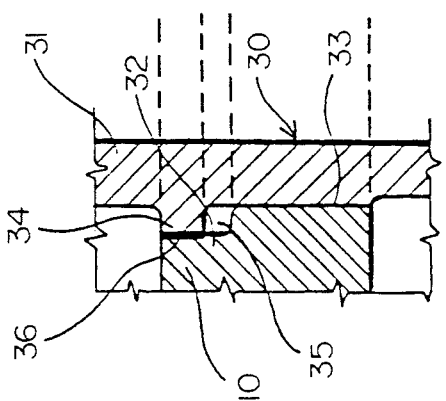
FIG. 3 is, on an enlarged scale, the detail indicated by III in FIGS. 1 and 5, and refers to the welded connection of the upper end of a chandelle in general of the diagrid to the upper tube plate of the grid.

The upper tube plate 10, through which the upper end 31 of a chandelle 30 in general passes, is visible in FIG. 3.

The upper tube plate has a through hole in it, equipped at the top with a bore: in this way two cylindrical surfaces 32 and 33 are defined.

The first of these, 32, has to be welded to the chandelle 30. For this purpose the chandelle 30 has a flange 34, the lateral surface of which is shorter than the height of the cylindrical surface 32, so as to form a circular duct 35 serving as an expansion joint and as a stopping area of the weld bead 36, consisting of a slender cylindrical bead obtained with a laser beam in the manner described below.

The cylindrical surface 33, with a smaller diameter, acts instead as a centering surface for the upper end of the chandelle 30.

Figure 4:
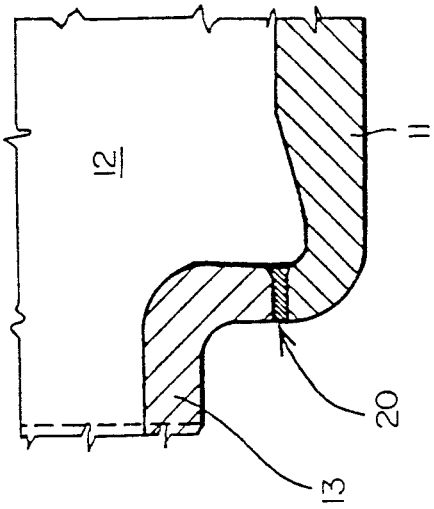
FIG. 4 is, on a larger scale, the detail indicated by IV in FIGS. 1 and 5, and refers to the welded connection of the lower end of a chandelle in general of the diagrid to the lower tube plate of the grid.
Figure 5:
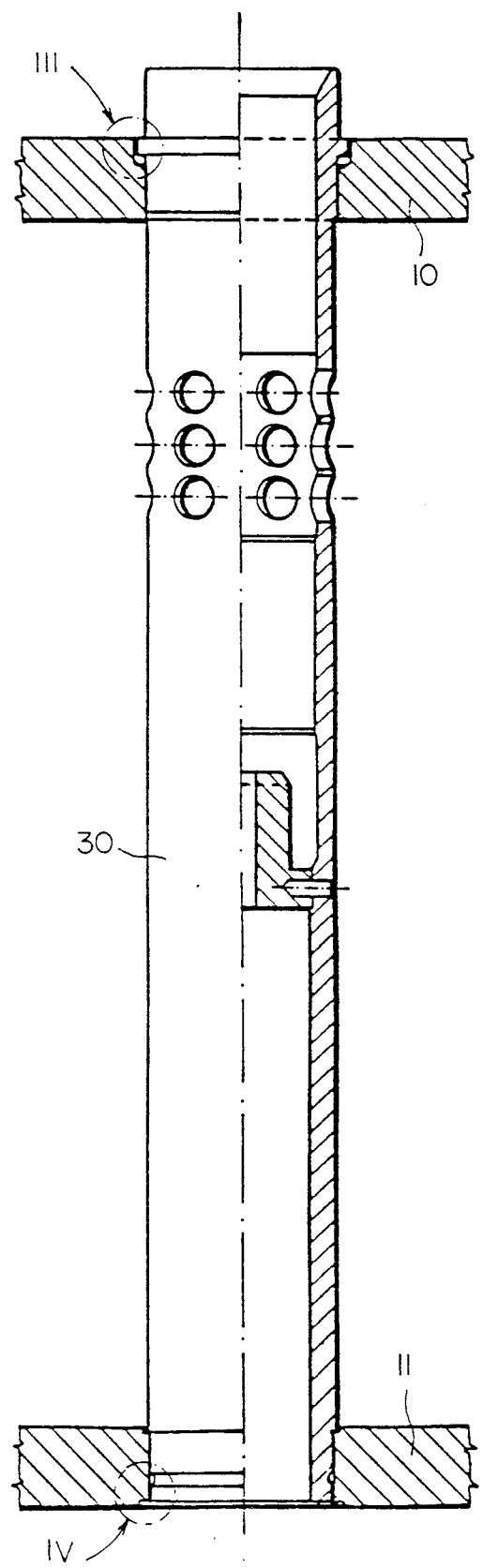
FIG. 5 shows, half as an axial cross-section, a chandelle to be welded by its two ends to the two tube plates of the diagrid according to the invention.
Figure 6:
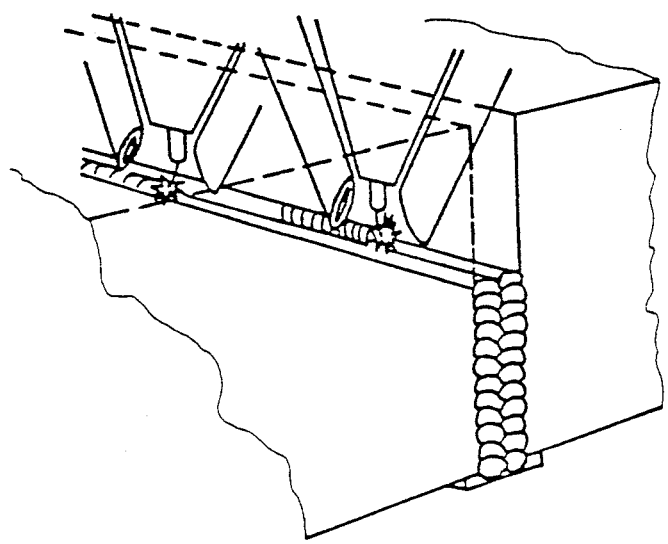
FIG. 6 shows schematically, in perspective, a first type of system for welding thick plates as per FIG. 2, using two torches with the submerged-arc technique.
Figure 7:
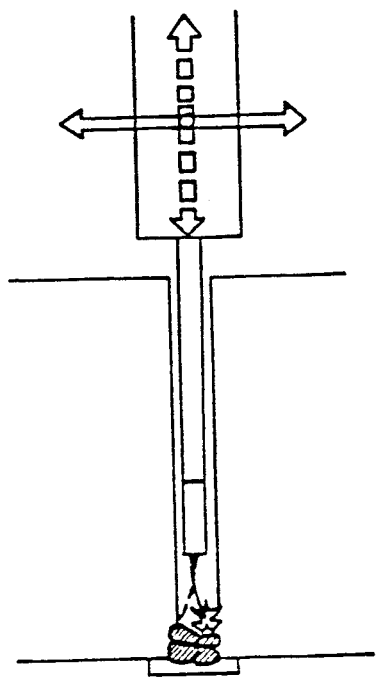
FIG. 7 is the cross-section of an alternative system for making the same weld, using a single torch with a mobile head, capable of making a weld seam identical to that obtained with a pair of torches.
Figure 8:
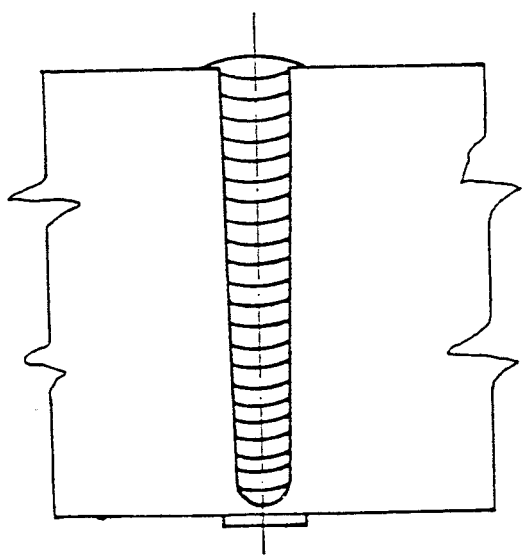
FIG. 8 shows, as a cross-section, the appearance of the full-penetration weld made by consecutive passes, each of which involving the whole width of the throat.

FIG. 4 illustrates the connection between the lower end 37 of the chandelle 30 and the lower tube plate 11. In this case the lower tube plate is equipped with a through hole 40 having a diameter equal to the nominal diameter of the lower end of the chandelle 30.

The chandelle is however equipped with a circular shoulder 38 creating a resting surface, and a circular groove 39.

The cylindrical surface of the lower end 37 of the chandelle 30 located above said groove 39 comes into contact with a first portion 41 of the cylindrical centering surface 40, with a centering function.

The cylindrical surface of the lower end 37 of the chandelle 30 located below the groove 39, on the other hand, is opposed to a second, lower, portion 42 of the cylindrical centering surface 40, and it is on this surface 42 that the slender weld bead 43 also obtained with a laser beam will be developed.

In this case too the groove 39 creates a circular cavity similar to the cavity 35.

In the welded structure covered by this invention there are only slender weld beads 20, 36 and 43; in addition to the lighter weight of the welded structure as compared to a bolted structure, there is also the dimensional stability typical of a weld made with a minimum quantity of filler metal.

Following are the results of the tests carried out on a specimen shell of the type claimed, from which the following can be seen:

the feasibility of a welded joint of the above type for AISI 304 L stainless steel;

the mechanical characteristics of said joint;

the effect of a stress-relieving heat treatment on the joint, by measurement of the residual weld stresses on the joint;

the amount of welding deformations.

Figure 9:
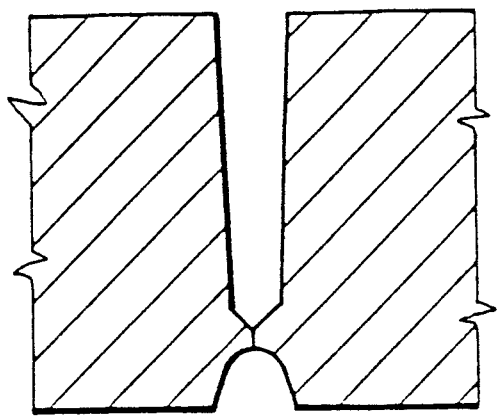
FIG. 9 is a transverse cross-section showing the preparation of the facing edges of the thick plates to be butt welded using the submerged-arc technique according to a preferred form of embodiment of the invention.

In order to test the reliability of the thick-plate weld 20 according to the invention, tests were carried out, as stated above, on models of cylindrical shells using the submerged-arc technique, with the groove illustrated in FIG. 9.

The tests consisted of making circular narrow gap welds to join two previously manufactured shells φ 900 mm and 400 mm long, and then carrying out the following checks:

measurement of the deformations and the of the interpass temperature during welding;

non-destructive testing of the joint by X-ray examination, ultrasonic inspection and liquid penetrant inspection;

destructive testing of the joint and base material (tensile, bending and impact strength tests, microscopic examination, chemical tests, ferrite determination, hardness);

measurement of residual welding stresses;

stress-relieving heat treatment;

repetition of the measurement of residual welding stresses.

Two mock-ups were made, in order to check better the repeatability of the process and to obtain a sufficient number of specimens for the tests envisaged.

First example of a thick-plate butt weld by submerged-arc welding

In this case submerged-arc welding (SAW) was used for the butt weld of the specimen stainless steel shell. This process was preferred for three basic reasons:

(1) In order to allow use of extremely simple welding heads, easily adaptable to existing welding machines.

Indeed the philosophy often applied in boiler-manufacturing workshops is to take the welding machine to the item to be welded and not vice versa. It is sufficient to think how much simpler it is to move machinery weighing only a few hundred kilos rather than vessels weighing tens of tons. In these conditions, the welding machines have to be as simple as possible so that they do not require complex maintenance operations and above all are not likely to suffer severe damages in the event of impacts during the frequent shiftings.

It is also preferable to have welding heads which do not contain mechanisms particularly sensitive to dust or temperature.

(2) Ecology of the work environment.

In submerged-arc welding the electric arc is not visible and the quantity of fumes produced is negligible.

From an ecological point of view, this means that it is one of the cleanest welding processes.

(3) The possibility of having a high degree of purification of the metal pool, using sufficiently pure fluxes so as not to pollute the deposited metal.

It is important not to forget the extreme conditions of constraint in which the weld beads touching each edge of the groove solidify.

The presence of even a small quantity of impurities giving rise to compounds capable of melting at low temperatures might entail a serious danger with reference to centreline cracks.

In addition, the slag must be easily removable and therefore its breaking load must be limited.

In general in fluxes for SA welding this feature is obtained by increasing the percentage of Si present. In narrow-gap welding of stainless steel, however, it is necessary to keep the amount of silicon in the deposited metal below 0.9%; higher percentages might give rise to crackability or in any case to unacceptable data ferrite percentages for components with high working temperatures.

Another important feature the flux must have is its insensitivity to small variations in the electrical welding parameters: in particular voltage variations in the region of +1V may not prejudice correct connections between the walls of the groove and the molten area.

Since the width of the bevel was very small (only 63 mm), according to the invention a very narrow torch was used as compared to those normally available on the market, and capable of fulfilling the following functions:

guiding the wire within the bevel ensuring the correct power supply through the electrode wire being sufficiently stiff.

The system created provides power through a 3 mm thick copper plate insulated on its side surfaces by ceramic elements mechanically secured to the copper blade by Vespel screws. Vespel is a very special material with excellent machinability, good mechanical characteristics even at high temperatures and a very low electrical conductivity.

The mechanical stiffness of the welding gun was ensured by the steel part hinged to the body of the gun and electrically insulated.

In turn, the wire-holder pad, also made of Vespel, was fixed to the gun by means of a second hinge. The second hinge ensured that the pressure exerted by the steel part on the wire-holder pad would make the wire always adhere perfectly to the current-bearing copper part.

The pressure between the Vespel pad and the electrode-wire could be adjusted by means of a variably strainable spring. The duct through which the flux was distributed was adjustable in length so as to allow the correct determination of the layer of flux on the arc area. The overall thickness of the torch was less than 5 mm.

Positioning of the gun on the groove was done manually, and it was also raised manually between one pass and the next.

After correctly positioning the parts of the shell forming the model diagrid according to the invention, the internal bevel was welded manually using a metal arc welding process with covered electrode, with the following operational parameters:

| electrode | A5/4-81 E308L 15 |
|---|---|
| electrode diameter | 3.25 mm |
| current intensity | 80-100 A |
| voltage | 22 – 25 V |

The sound material was then rewelded at the end of said well bead, working with a machine-tool from outside the shell forming the model diagrid.

Figure 10:
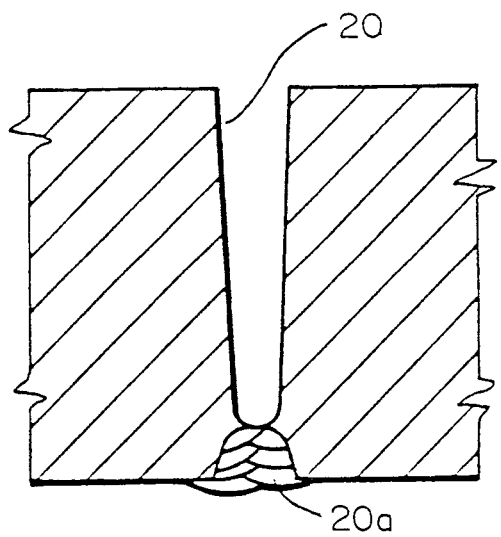
FIG. 10 shows a cross-section of the appearance of the weld started on the inside, after mechanical removal of the initial bead (rewelding of sound material), starting from the groove of FIG. 9.
Figure 11:
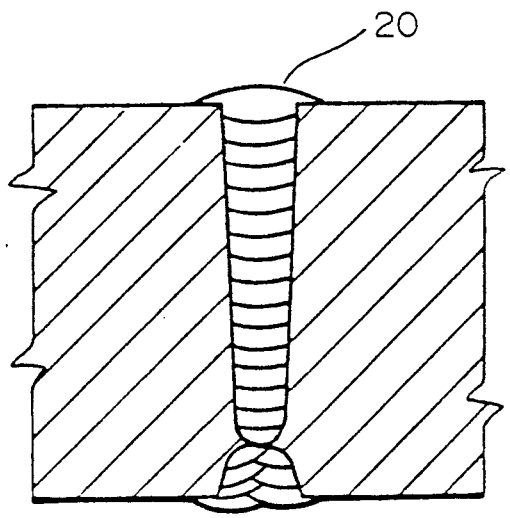
FIG. 11 is a cross-section showing the appearance of the weld described in the foregoing figure, after completion of welding.

After this mechanical operation, the appearance of the joint 20 was as shown in FIG. 10.

Submerged-arc welding was then performed, using the following parameters:

| wire | ASW A5.9-81 ER308L |
|---|---|
| wire diameter | 2.4 mm |
| intensity of current | 280 A |
| voltage | 30 V |
| welding speed | 540 mm/1' |
| thickness of flux bed | 15 mm |

The flux used had the following chemical composition, expressed in percentages of oxide:

| $SiO_2$ | 25% |
|---|---|
| $Al_2O_3$ | 25% |
| $CaO + MgO + K_2O + NA_2O$ | 35% |
| $MnO + FeO$ | 4% |
| $Cr_2O_3$ | 4% |
| Fluorides | rest |

Before use, the flux ws dried at 400° C. The single-pass technique was used to fill the groove, and 16 passes were needed (FIG. 10).

During this phase particular care was taken to give the surface of the run a correct shape.

Concave beads would have magnified any crackability in the centre of the run, while convex beads would have prejudiced the removability of the slag.

The best shape for the passes was felt to be with practically flat, only slightly convex surfaces, and this was used.

During circular welding of the shell forming the model diagrid, the following dimensional checks were carried out:

a. measurement on the external and internal surfaces of the shell of deformations crosswise to the joint during manual welding with covered electrode (tables 1 and 2);

b. measurements on the external surface of the ring of deformations crosswise to the joint during submerged-arc welding (table 3);

c. measurement of deformations on the inside diameter during manual welding with covered electrode and during submerged-arc welding (table 4).

As shown in tables 1 and 2, the largest crosswise deformations are those obtained using the manual electrode, varying between 0.85 and 1.35 mm on the outside and 1.20 and 1.25 on the inside.

The relatively high vales of these data, particularly if compared to those measured afterwards for the submerged-arc welding, is explained by the fact that the piece was free to contract at will, as it had not been bracketed but only tacked to the inside of the weld groove.

TABLE 1

Deformations crosswise to the joint measured on the outer surface during manual welding with covered electrode.
(measurements expressed in millimeters)

| Pos. no. | After the 1st pass | After the last pass | Total deformation |
|---|---|---|---|
| 1 | 0.47 | 0.83 | 1.30 |
| 2 | 0.57 | 0.78 | 1.35 |
| 3 | 0.37 | 0.58 | 0.95 |
| 4 | 0.45 | 0.40 | 0.85 |
| 5 | 0.37 | 0.85 | 1.22 |
| 6 | 0.33 | 1.00 | 1.33 |

TABLE 2

Deformations crosswise to the joint measured on the inside surface during manual welding with covered electrode.
(measurements expressed in millimeters)

| Pos. no. | After the 1st pass | After the last pass | Total deformation |
|---|---|---|---|
| 1 | 0.42 | 0.83 | 1.25 |
| 2 | 0.39 | 0.88 | 1.27 |
| 3 | 0.28 | 0.97 | 1.25 |
| 4 | 0.38 | 0.85 | 1.23 |
| 5 | 0.40 | 0.80 | 1.20 |
| 6 | 0.39 | 0.86 | 1.25 |

TABLE 3

| | Deformations crosswise to the joint measured on the outside surface during submerged-arc welding. (measurements expressed in millimeters) | | | | | | | | |
|---|---|---|---|---|---|---|---|---|---|
| Pos. no. | After 2nd pass | Betw. 2nd + 4th pass | Betw. 4th + 6th pass | Betw. 6th + 8th pass | Betw. 8th + 10th pass | Betw. 10th + 12th pass | Betw. 12th - 14th pass | Betw. 14th - 16th pass | Total deform. |
| 1 | 0.25 | 0.15 | 0 | 0.10 | 0.40 | 0 | 0 | 0 | 0.90 |
| 2 | 0.35 | 0.10 | 0 | 0.10 | 0.35 | 0 | 0 | 0 | 0.90 |
| 3 | 0.25 | 0.07 | 0 | 0.13 | 0.35 | 0 | 0 | 0 | 0.80 |
| 4 | 0.35 | 0.05 | 0 | 0.10 | 0.40 | 0 | 0 | 0 | 0.90 |
| 5 | 0.27 | 0.10 | 0.05 | 0.10 | 0.40 | 0 | 0 | 0 | 0.92 |
| 6 | 0.30 | 0.10 | 0.05 | 0.05 | 0.45 | 0 | 0 | 0 | 0.95 |

TABLE 4

| | Deformations on inside diameter - SMAW and SAW (in mm) | | | | |
|---|---|---|---|---|---|
| Axis of measurement | After 1st SMAW pass | After compl. of SMAW | After re-welding | After compl. of SAW | Total Deformation |
| Near to joint | 0.00 | 0.05 | 0.00 | 0.60 | 0.65 |
| At 150 mm from joint | 0.00 | 0.00 | 0.00 | 0.17 | 0.17 |
| At 180 mm from joint | 0.00 | 0.15 | 0.00 | 0.00 | 0.15 |
| Values measured on axes | 0.00 | 0.10 | 0.05 | 0.60 | 0.75 |
| axes staggered by 90° | 0.00 | 0.10 | 0.05 | 0.10 | 0.25 |
| as compared to above | 0.00 | 0.05 | 0.05 | 0.00 | 0.10 |

Figure 12:
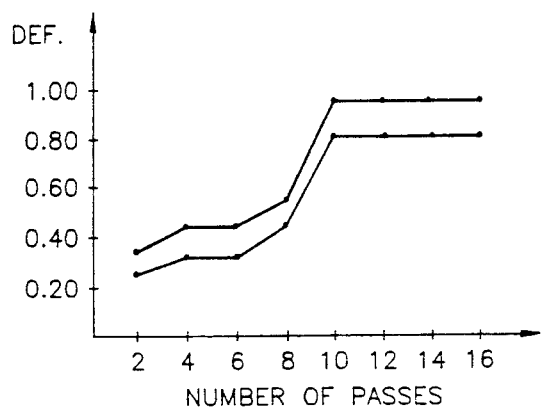
FIG. 12 shows the pattern of deformations crosswise to the welded joint during submerged-arc welding.

As shown in the graph in FIG. 12, the greatest crosswise deformations occurred during the first four passes and during the passes from the 6th to the 10th. This is due in the first case to the low self-constraining effect of merely manual welding during the first 4 passes.

Figure 13:
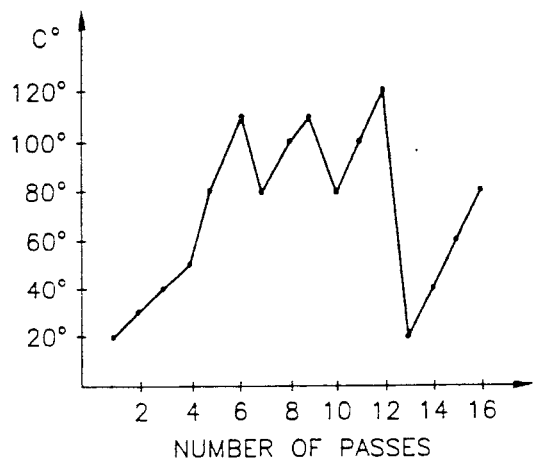
FIG. 13 shows the progress of the interpass temperature during submerged-arc welding.
Figure 14:
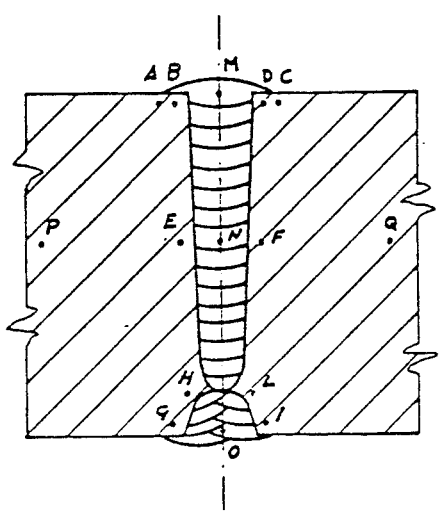
FIG. 14 is similar to FIG. 11, but indicates the points where the hardnesses shown in table 5 were measured.
Figure 15:
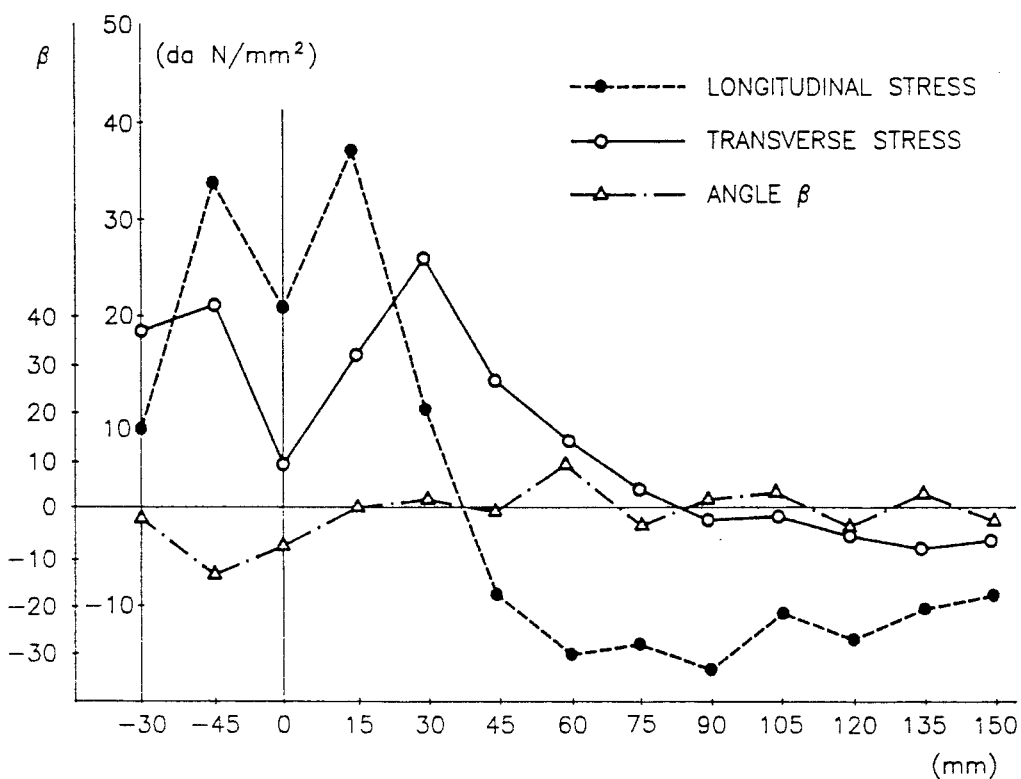
FIG. 15 shows the pattern of the stresses measured on the external surface of the diagrid, crosswise to the thick butt weld obtained by submerged-arc welding, before the stress-relieving heat treatment.
Figure 16:
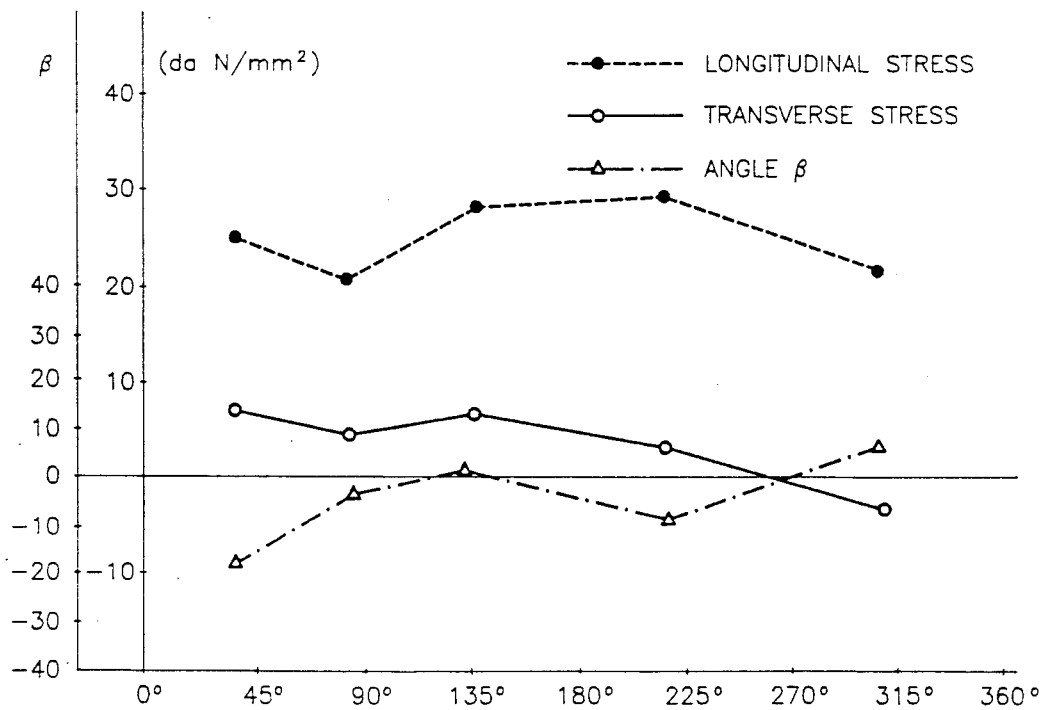
FIG. 16 shows the pattern of the stresses measured on the external surface of the diagrid, parallel to the welded joint, before the stress-relieving heat treatment.
Figure 17:
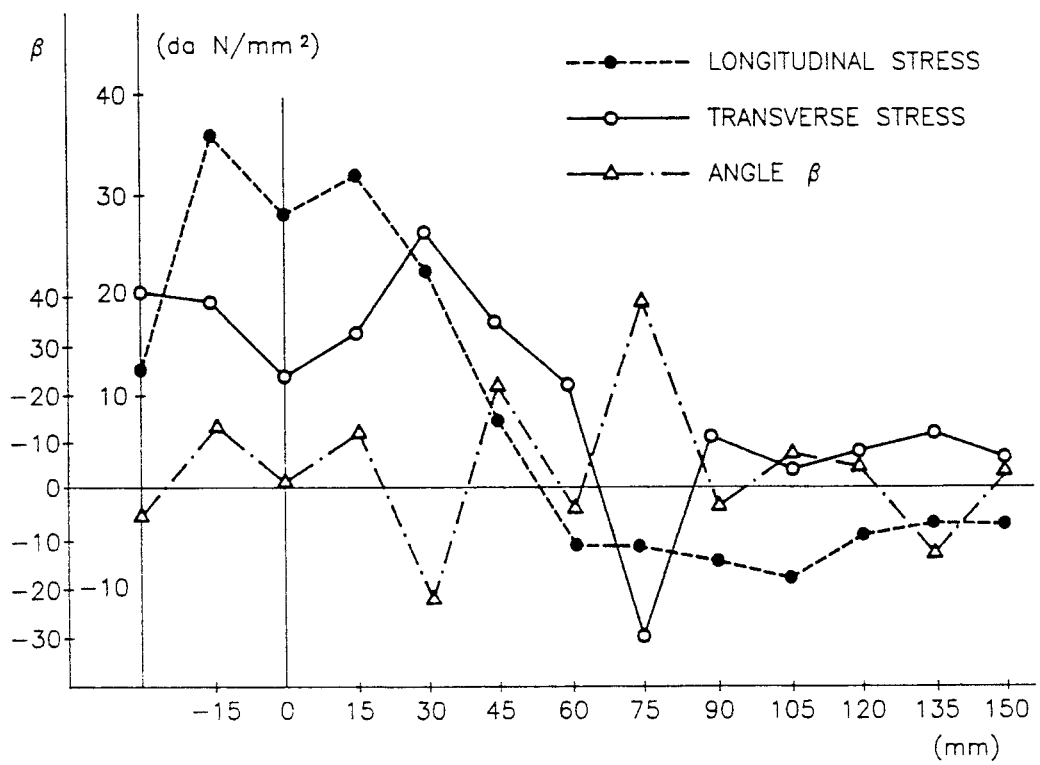
FIGS. 17 and 18 are similar to FIGS. 15 and 16, but refer to values measured after the stress-relieving treatment.
Figure 18:
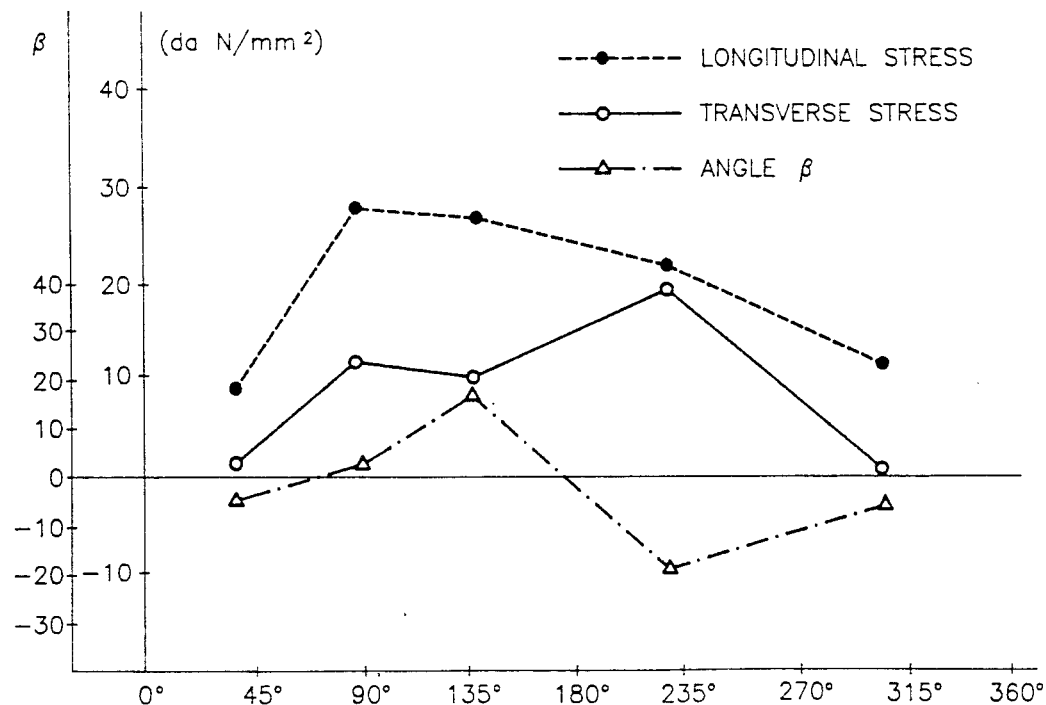

In the case of the passes from the 6th to the 10th, on the other hand, the temperature on starting welding was always maintained between 80° and 100° C., as shown in the graphs of FIGS. 13.

Although partly carried out at a high temperature, passes 10 to 16 produced no deformations thanks to the self-constraining effect exerted by the material already deposited.

As far as concerns the deformations on the diameter (table 4), the maximum value of about 0.7 mm confirms how limited these phenomena are in this type of welding.

The results of the subsequent destructive and non-destructive tests are summarized herebelow.

The results obtained in the tensile tests showed yield strengths, percentage elongations and ultimate tensile strengths well over the minimum tabular values required for the base material. The laterl folds confirmed the good quality of the bond between the molten material and the base material, and the complete absence of any failure to melt.

The micrographs of the joint show a fairly strong dendritic structure typical of submerged-arc welded stainless steel, and in particular of this type of weld in which the bead touches simultaneously the two cold walls of the joint.

The hardness variations crosswise to the joint were found to be limited (see FIG. 13 and table 5).

using three-branched rectangular strain rosettes type MM-EA-09-062-RE 120, in which 1.5 mm holes were made. The same tests were repeated after subjecting the piece to stress-relieving heat treatment in a furnace at a temperature of 550° C. for 2 hours.

The main stresses parallel and normal to the weld were determined.

The rosettes were positioned in several points at the centre of an crosswise to the joint in order to measure progress of the stresses in a circumferential and a transverse direction.

FIGS. 13, 14, 15 and 16 show some of the stress values measures in the two directions, longitudinally and crosswise to the joint, and the main angle for the following cases:

transversally to the joint before the stress-relieving heat treatment;

circumferentially to the joint before the stress-relieving heat treatment and similarly for the values measured after the stress-relieving heat treatment. It can be seen from the graphs that the greatest stresses are not on the bead but 15 mm away from it. This behaviour seems to be attributable to the stress-relieving effect each pass exerts on the preceding pass.

Obviously this phenomenon involves a limited area of the joint, concentrating instead the greater stresses at a greater distance.

The stress-relieving heat treatment led to no appreciable fall in the average condition of stress of the joint, only to a slight drop of the highest peaks which can be evaluated at 5%.

Second example of embodiment of a butt weld, by laser

TABLE 5

| A | B | C | D | E | F | G | H | I | L | M | N | O | P | Q |
|---|---|---|---|---|---|---|---|---|---|---|---|---|---|---|
| 206 | 198 | 191 | 206 | 212 | 222 | 227 | 212 | 241 | 222 | 274 | 247 | 247 | 178 | 185 |

The non-destructive tests (X-ray, US and LP) revealed no flaws.

The distribution of the residual stress both on the outer and on the inner surfaces of the circumferential weld was determined experimentally.

The tests were carried out using the semi-destructive blind-hole method as per ASTM standard E 837-81 and welding It is well-known that a suitably focused higher-power laser beam (of the order of kilowatts) produces autogenous welding with characteristics partly similar to those of an electric beam.

Figure 19:
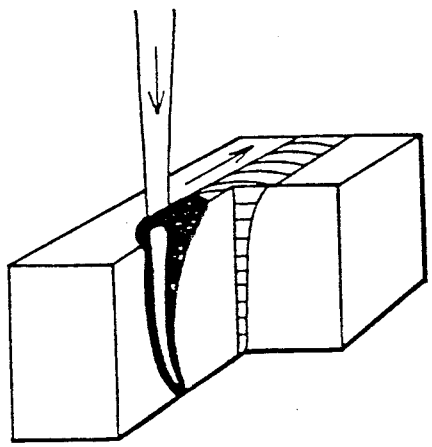
FIG. 19 shows schematically the field of interaction between the base metal and the laser beam, with specific reference to thick plate welding with this technique rather than submerged-arc welding.

In particular, again limited to high power levels, the physical configuration achieved in deep penetration welding (melting for a depth of several millimetres) is the same present in electronic beam welding. The electronic or focused laser beam causes vaporization of a very limited volume of metal of a very approximately cylindrical shape, with a diameter corresponding roughly to the diameter of the focused beam (fractions of a millimetre) and a height of the order of millimetres; the interaction between the beam and the metal is therefore localized on the inside walls of this cavity (called the key-hole), and in the ionized gases contained in it (FIG. 19). The metal surfaces are highly reflective on the wavelength of carbon dioxide lasers (10.6 microns) commonly used for welding. But once vaporization of the surface and the consequent formation of key-holes has been initiated, reflectivity drops drastically (from over 90% to 30% or less). The energy radiated by the laser is thus absorbed in depth too by the metal, determining a highly efficient relationship between the volume of the molten metal and the het input into the piece. As a result, deep-penetration laser welding is a very fast process. Limiting these considerations to stainless steel only, the consequences are:

reduced quantity of deformations induced by welding, thanks to the limited heat input;

reduced dimensions of the area affected by the heat, for the same reason;

reduced formation and segregation of compounds of the alloy elements, thanks to the speed of the process, which limits the presence of the liquid phase in time. In addition to this, laser welding entails no inertial transfer to the piece, it can be carried out from any direction in respect both of gravity and of the direction normal to the surface, and by means of mirrors it can be carried out in many otherwise inaccessible points. These features mean that laser welding can be automated to a great extent. Indeed, it could be said that considering the high cost of deep welding laser equipment, automation capability is indispensable in many applications to allow an economic return.

The possiblity of repeating the weld on the same joint on the opposite side, even when this is not easily accessible, is a peculiar feature of laser welding. The ability to direct the beam in any direction whatsoever by means of mirrors makes it possible, for example, not only to weld components on their inside surfaces through very narrow openings, it also allows rapid transfer of the beam from the outside to the inside surface. This means that processing times can be reduced when this technique is applied. Nothing prevents a combination of narrow-gap welding and welding on opposite sides, which further increases the thicknesses which can be welded. Obviously in the case of components having one not easily accessible side, the grooves would be made only on the more accessible side.

In the example of butt welding using a laser beam, it is possible to hold the whole structure of the diagrid still. In this case it is the equipment generating the laser beam which is made to rotate around the axis of the grid, moving limited masses.

It is possible to carry out butt welding from opposite directions or, as an alternative, the first weld bead is in both cases made by simple autogenous laser welding; consequently the deformations induced are negligible, while the constraint of the piece in this way inhibits the deformations which would otherwise be produced by the subsequent welding passes.

A relatively simple double optical system (FIGS. 19 and 20) is capable of reaching, by removing a single mirror, both the outer and the inner side of the joint, performing the circular weld rapidly with a single rotation. This aspect is the key to the economical convenience of the process.

With reference to a total thickness of 50 mm to be welded, the opposite welds process entails the availability of very high-power lasers (20 kW) and out-of-axis parabolic mirrors suitable for such powers levels.

Laser narrow-gap welding exploits the advantage of being able to use flat grooves, in addition to being able to constrain the deformations by means of the first autogenous weld.

Figure 20:
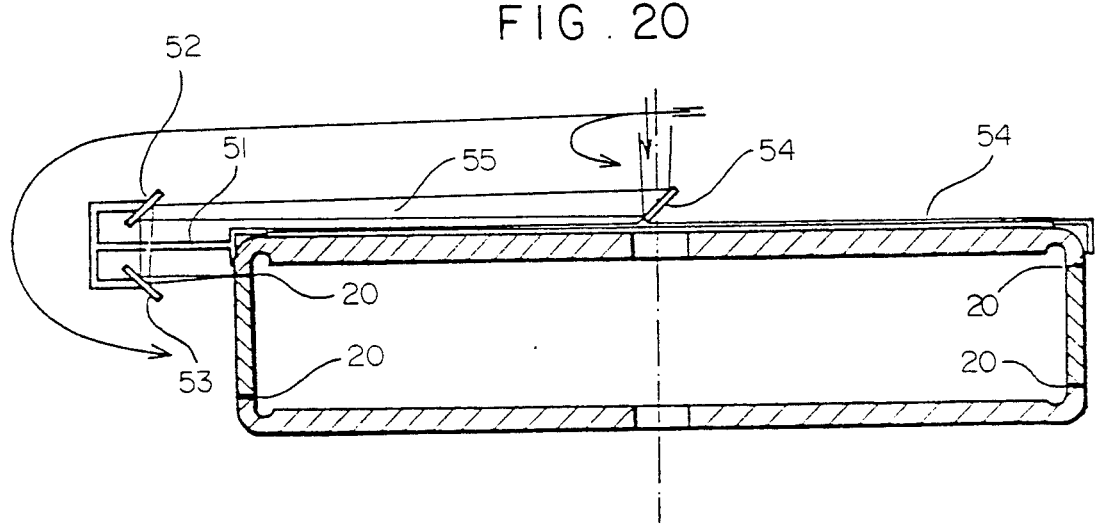
FIGS. 20 and 21 show a simplified axial cross-section of the diagrid according to the invention, with the laser beam welding equipment used for the full-penetration butt welds.

The equipment illustrated in FIG. 20 is capable of laser narrow-gap welding from outside the ring.

A rotating frame 50, coaxial to the diagrid, has an arm 51 sustaining two reflecting mirrors 52 and 53 which receive the laser beam 55 from a mirror 54 supported in a central position not illustrated in detail.

The laser beam is focused on the line of the joint 54 between the tube plate, in this case the upper one, and the cylindrical shell.

The diagrid is immobile, while it is the frame 54 with the device (not shown) for generating the beam and its transmission system 52, 53 and 54, which rotates.

Figure 21:
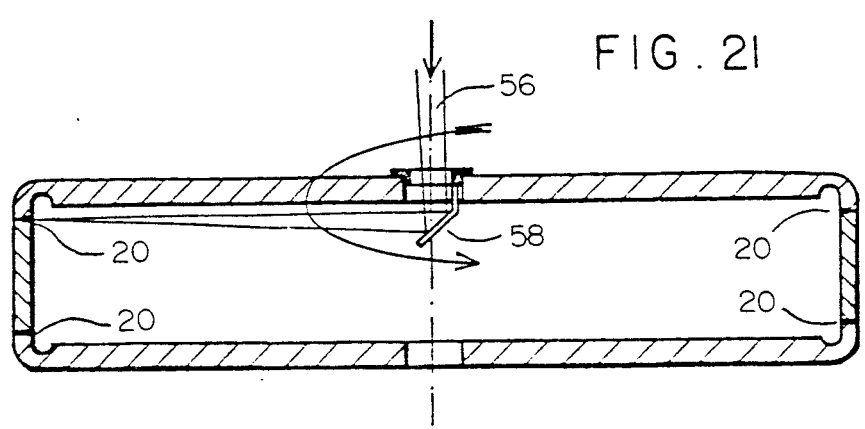

In FIG. 21 the origin of the laser beam 56 is still the vertical direction coinciding with the axis of the diagrid.

The laser beam 56 passes through the upper tube plate, under which a reflecting mirror 58 directs it onto the line of the joint between the shell and the tube plate where the weld bead 20 is to be made.

Figure 22:
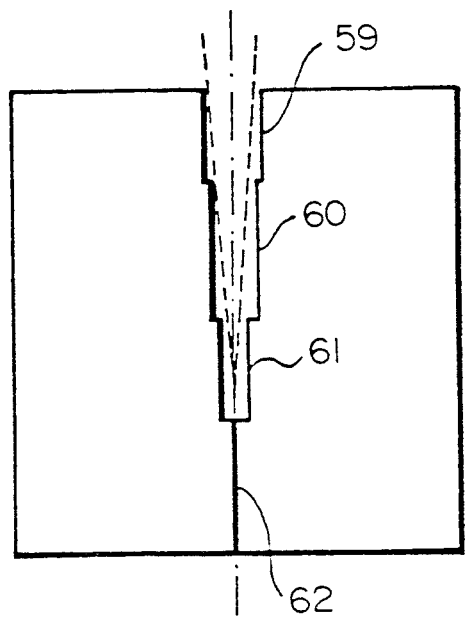
FIG. 22 shows the groove envisaged for full-penetration butt welding using a laser beam.

When a laser beam is used, according to the invention the groove for the very thick weld must be as illustrated in FIG. 22.

For a sample thickness of 50 mm, the groove has three vertical-walled steps 59, 60 and 61, while the last portions of the thicknesses of the opposing plates are directly in contact.

The thickness of the plates is thus divided up by said steps into approximately equal parts.

Laser welding of the chandelles to the tube plates

Figure 23:
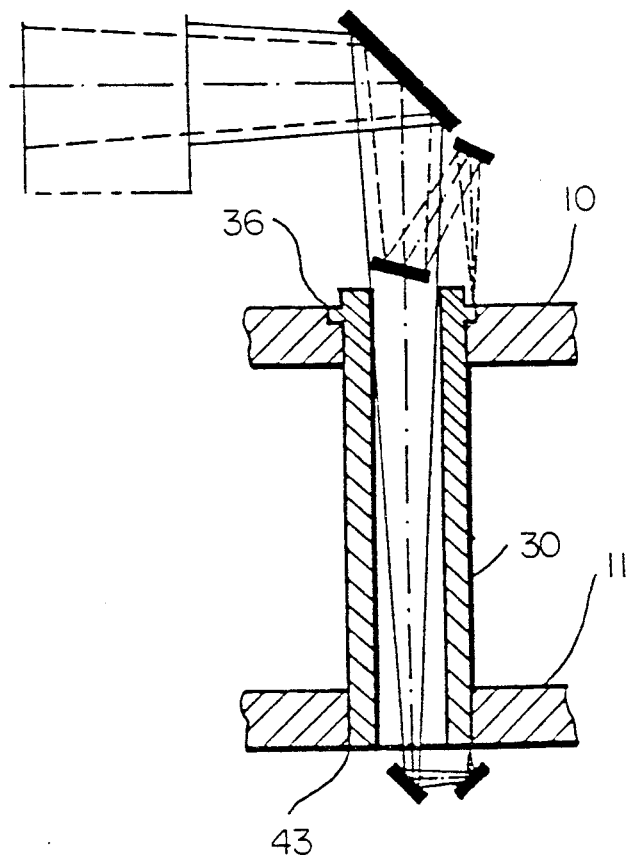
FIG. 23 shows schematically an axial cross-section of the optical layout for simultaneous welding of both ends of a chandelle to the two tube plates of the diagrid using a laser beam.

FIG. 23 shows an optical system suitable for making simultaneously the two circular welds 36 and 43 sealing the joint between the ends of the chandelle 30 and the tube plates 10 and 11.

In this case the mirrors used are five, suitably supported by a single piece of the equipment not illustrated in detail and which is capable of rotating around the axis of the chandelle to be welded, while the diagrid remains immobile.

Figure 24:
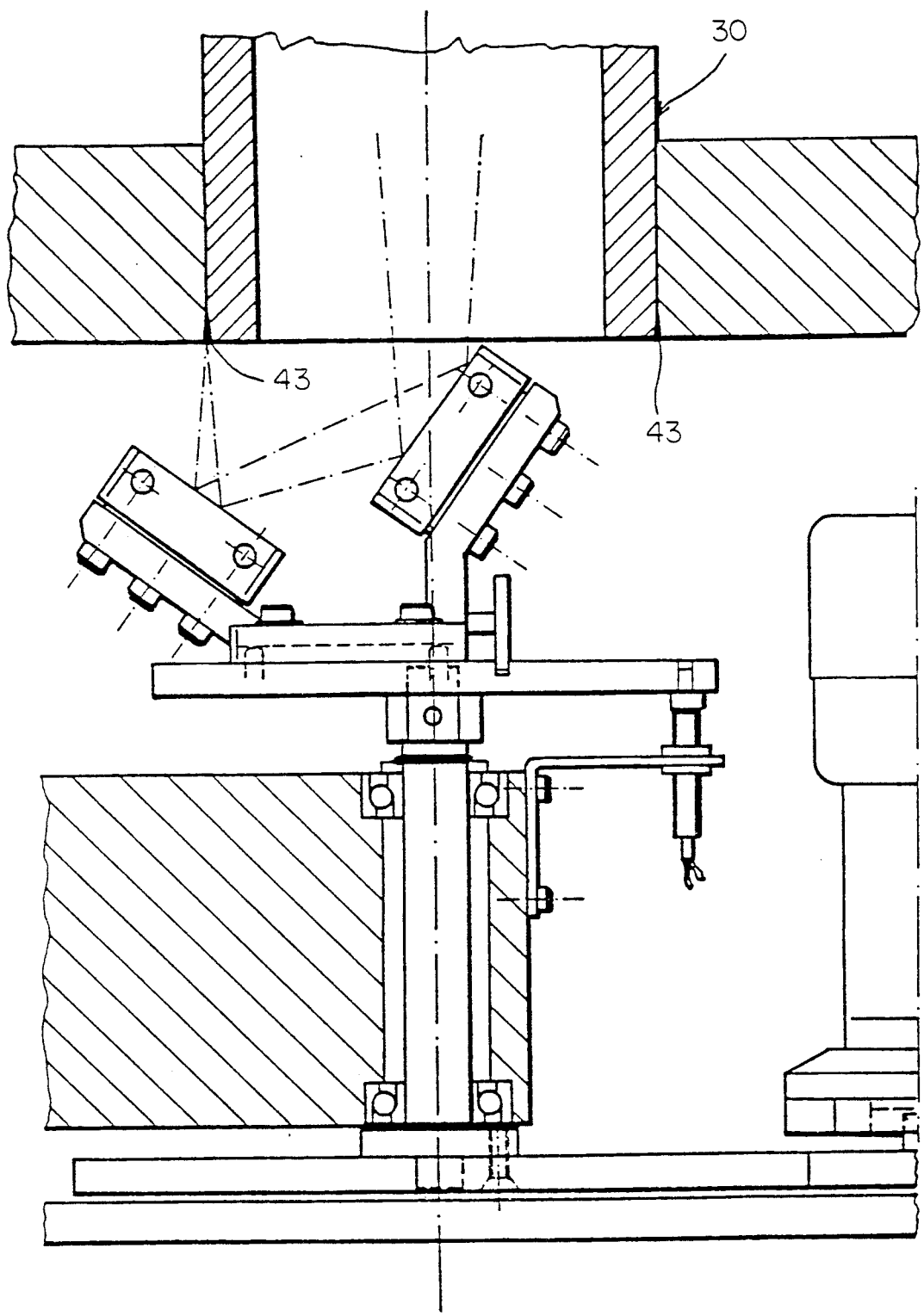
FIG. 24 is similar to FIG. 23, but refers to a simplified system capable of welding the chandelle to the lower tube plate only of the diagrid.

In FIG. 24, on the other hand, a simplified piece of equipment again capable of rotating while the diagrid remains immobile is shown. This is used to make the lower weld 43 of the chandelle 30.

In this case the mirrors used are only two, and receive the laser beam from a generator arranged above the diagrid, which sends the beam vertically downwards on the same axis as the chandelle 30.

Figure 25:
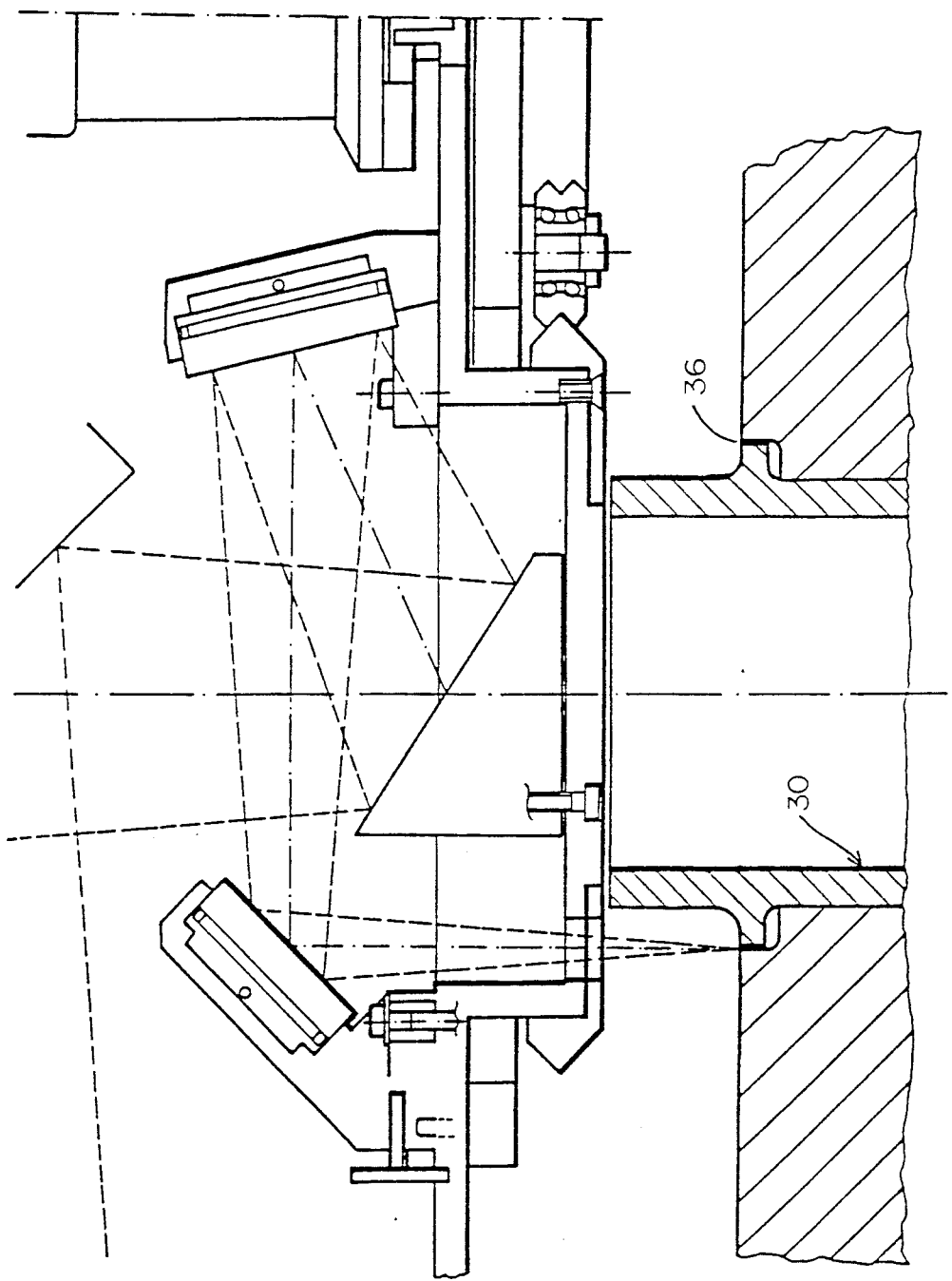
FIG. 25 is similar to FIG. 23, but refers to a simplified system capable of welding the chandelle to the upper tube plate only of the diagrid.

In FIG. 25 there is another piece of equipment, a simplified version of the system illustrated in FIG. 23, rotating in respect of the immobile grid, which receives the laser beam aimed vertically downwards and redirects it onto the weld 36.

In this case three mirrors are used, and the equipment is mounted on the axis of the chandelle 30.

What I claim is:

1. A diagrid for a nuclear reactor core comprising an upper plate, a lower plate, a cylindrical shell with input and output ducts for heat exchange fluid between the upper and lower plates, a first continuous circumferential weld connecting the upper plate to the cylindrical shell, a second continuous circumferential weld connecting the lower plate to the cylindrical shell, a plurality of hollow cylindrical columns extending between the upper and lower plates inside the cylindrical shell, third continuous welds around the respective columns connecting the columns to the upper plate and fourth continuous welds around the respective columns connecting the columns to the lower plate wherein each of the first and second welds has a cross-section shaped as back-to-back interconnected U's of different dimensions respectively comprising a longer U and a shorter U.

2. A diagrid as claimed in claim 1 wherein the hollow cylindrical columns engage in respective apertures in the top plate, each aperture having a smaller diameter portion and a larger diameter portion, each column having an outer surface portion thereof engaging the smaller diameter portion of the respective aperture, the column further having a projecting annular flange received within the larger diameter portion of the aperture, the respective third weld being formed between the flange and the larger diameter portion of the aperture, the third weld extending substantially across the entire axial dimension of the flange, and the axial dimension of the larger diameter portion of the aperture being greater than the axial dimension of the flange whereby an annular duct is formed between the cylindrical column and the larger diameter portion of the aperture adjacent the flange.

3. A diagrid as claimed in claim 1 wherein each of the cylindrical columns protrudes from the upper plate.

4. A diagrid as claimed in claim 1 wherein the hollow cylindrical columns engage in respective apertures in the bottom plate, each column having a circumferential groove received in the respective aperture and an end portion adjacent said groove, the respective fourth welds being formed between the respective end portions of the columns and the respective apertures in the bottom plate and extending substantially over the entire axial dimension of the end portion.

* * * * *